United States Patent [19]

Mathumoto et al.

[11] Patent Number: 5,171,814
[45] Date of Patent: Dec. 15, 1992

[54] ALPHA-METHYLSTYRENE HIGH-CONTENT COPOLYMERS, A PROCESS FOR THEIR PRODUCTION AND THERMOPLASTIC RESIN COMPOSITIONS CONTAINING ALPHA-METHYLSTYRENE HIGH-CONTENT COPOLYMERS

[75] Inventors: Shigemi Mathumoto, Takasago; Fumiya Nagoshi, Kobe, both of Japan

[73] Assignee: Kanegafuchi Kagaku Kogyo, Osaka, Japan

[21] Appl. No.: 875,575

[22] Filed: Apr. 27, 1992

Related U.S. Application Data

[63] Continuation of Ser. No. 650,280, Feb. 4, 1991, abandoned, which is a continuation of Ser. No. 310,000, Feb. 8, 1989, abandoned, which is a continuation of Ser. No. 135,471, Dec. 21, 1987, abandoned, which is a continuation of Ser. No. 869,828, May 30, 1986, abandoned, which is a continuation of Ser. No. 271,205, Jun. 8, 1981, abandoned.

[30] Foreign Application Priority Data

Jun. 16, 1980 [JP] Japan .................. 55-81860

[51] Int. Cl.$^5$ .................. C08F 220/18; C08F 220/44; C08F 212/10
[52] U.S. Cl. .................. 526/329.2; 526/342; 526/347
[58] Field of Search .................. 526/342, 324, 329.2

[56] References Cited

U.S. PATENT DOCUMENTS 4,294,946 10/1981 Minematsu et al. .................. 526/80
4,526,928 7/1985 Mathumoto et al. .................. 525/76

Primary Examiner—Joseph L. Schofer
Assistant Examiner—Wu C. Cheng
Attorney, Agent, or Firm—Armstrong, Nikaido, Marmelstein, Kubovcik & Murray

[57] ABSTRACT

An α-methylstyrene high-content copolymer which is characterized by that it is a copolymer which comprises 65–90 parts by weight of α-methylstyrene with 35–10 parts by weight of acrylonitrile and 0–5 parts by weight of a copolymerizable vinyl monomer or monomers and that a component having an α-methylstyrene content of 82% or higher is contained in an amount of 30 parts by weight or more. Such a copolymer may be produced by a process which comprises charging 65 parts by weight or more of α-methylstyrene and 10% by weight or less based on this α-methylstyrene of acrylonitrile and a vinyl monomer or monomers all in one portion at the initial stage, making the system fully emulsified, gradually adding 35 parts by weight or less of acrylonitrile and the vinyl monomer or monomers, and carrying out emulsion polymerization until the amount of a polymer produced has amounted to 50 parts by weight or more in such way that the ratio of the α-methylstyrene monomer to the monomers other than α-methylstyrene in the system is always maintained at 90/10 or higher on the weight basis. A thermoplastic resin composition comprises the above α-methylstyrene high-content copolymer and a graft copolymer obtained by reacting a diene rubber with monomer comprising a monovinyl aromatic compound and an unsaturated nitrile compound, the diene rubber being present in an amount of 5–30 parts by weight.

Molded products obtained from the composition of this invention have excellent heat resistance and impact resistance.

3 Claims, No Drawings

ALPHA-METHYLSTYRENE HIGH-CONTENT COPOLYMERS, A PROCESS FOR THEIR PRODUCTION AND THERMOPLASTIC RESIN COMPOSITIONS CONTAINING ALPHA-METHYLSTYRENE HIGH-CONTENT COPOLYMERS

This application is a continuation of application Ser. No. 07/650,280 filed Feb. 4, 1991, which in turn is a continuation of application Ser. No. 07/310,000, filed Feb. 8, 1989, which is a continuation of application Ser. No. 07/135,471, filed Dec. 21, 1987, which is a continuation of application Ser. No. 06/869,828, filed May 30, 1986, which is a continuation of application Ser. No. 06/271,205, filed Jun. 8, 1981, each of which is now abandoned.

BACKGROUND OF THE INVENTION

1. Field of the Invention

This invention relates to heat resistant copolymers having a high content of α-methylstyrene, a process for their production and thermoplastic resin compositions which contain α-methylstyrene high-content copolymers and have excellent heat resistance and impact resistance.

2. Description of the Prior Art

Today, a great number of thermoplastic resins are being utilized. One representative example thereof is ABS resins which are rubber-modified thermoplastic resins. However, in the field where high resistance to heat distortion was required, ABS resins were inadequate in this respect. Various methods to enhance the heat resistance of ABS resins have been proposed For example, Japanese Patent Publication No. 18194/1960 describes that a composition having high heat resistance and impact resistance is obtained by mixing a copolymer comprising α-methylstyrene and acrylonitrile with an ABS resin. However, the heat distortion temperature of this composition is as low as slightly above 100° C., and therefore its use has been inevitably limited where higher heat resistance was required. This is because when α-methylstyrene and acrylonitrile are free-radical polymerized in the emulsion state, the resulting copolymer is, for the most part, an alternating copolymer even when the ratio of both reactants to be charged is changed. That is, when the amount of α-methylstyrene is 70% by weight or more, the conversion to polymer suddenly decreases and α-methylstyrene monomer is thus left unreacted. This tendency is also observed with a terpolymer comprising α-methylstyrene, acrylonitrile and styrene. Further, Japanese Patent Publication No. 33661/1970 describes a process which comprises introducing α-methylstyrene into a polymer. According to this process, 75-90% by weight of α-methylstyrene and 25-10% by weight of acrylonitrile are copolymerized in a monomer mixture in the first stage, and subsequently in the second stage the polymerization of this gradually remaining α-methylstyrene is completed by adding a monomer chiefly comprising styrene and acrylonitrile. However, by this process, since even when the maximum amount, i.e. 90% by weight, of α-metylstyrene is employed, a reduction in conversion to polymer is brought about and thus it is difficult to make the content of α-methylstyrene in the polymer produced in the first stage 82% by weight or higher. Moreover, when the amount of α-methylstyrene used in the first stage is increased, the amount of the remaining α-methylstyrene is accordingly increased, which in turn requires an increase in amount of styrene and acrylonitrile to be added to polymerize the above α-methylstyrene in the second stage, thereby the α-methylstyrene content in the total polymer eventually results in merely 75% by weight or so. Thus, by the above-described conventional process, the heat resistance of each obtained composition had its limit. Similarly, poly-α-methylstyrene is known as an α-methylstyrene high-content polymer, but its thermal decomposition temperature is so low that it cannot be served for practical applications. Also from the aspect of production, it can only be produced by anionic polymerization and cannot be produced by free-radical polymerization.

As the result of our extensive study, we have discovered that an α-methylstyrene—acrylonitrile copolymer having a certain range of composition is excellent in heat resistance and that by mixing a graft copolymer with this copolymer satisfactory impact resistance is imparted and, based on this discovery, we have finally accomplished this invention.

SUMMARY OF THE INVENTION

According to this invention, there is provided an α-methylstyrene high-content copolymer which is characterized by that it is a copolymer which comprises 65-90 parts by weight of α-methylstyrene with 35-10 parts by weight of acrylonitrile and 0-5 parts by weight of a copolymerizable vinyl monomer or monomers and that a component having an α-methylstyrene content of 82% or higher is contained in an amount of 30 parts by weight or more.

This invention also provides a process for producing an α-methylstyrene high-content copolymer which process comprises charging 65 parts by weight or more of α-methylstyrene and 10% by weight or less based on this α-methylstyrene of acrylonitrile and a vinyl monomer or monomers all in one portion at the initial stage, making the system fully emulsified, gradually adding 35 parts by weight or less of acrylonitrile and the vinyl monomer, and carrying out emulsion polymerization until the amount of a polymer produced has amounted to 50 parts by weight or more in such way that the ratio of the α-methylstyrene monomer to the monomers other than α-methylstyrene in the system is always maintained at 90/10 or higher on the weight basis.

Further, this invention also provides a thermoplastic resin composition which comprises (A) an α-methylstyrene high-content copolymer comprising 65-90 parts by weight of α-methylstyrene with 35-10 parts by weight of acrylonitrile and 0-5 parts by weight of a copolymerizable vinyl monomer or monomers and containing 30 parts by weight or more of a component having an α-methylstyrene content of 82% by weight or higher, and (B) a graft copolymer which is obtained by reacting a diene rubber with a monomer comprising a monovinyl aromatic compound and a unsaturated nitrile compound, the diene rubber being in an amount of 5-30 parts by weight.

DESCRIPTION OF THE PREFERRED EMBODIMENT

What is especially important in this invention is the composition of the copolymer (i.e., the α-methylstyrene high-content copolymer). More particularly, it is a copolymer (A), which comprises 65-90 parts by weight of α-methylstyrene with 35-10 parts by weight of acrylonitrile and 0-5 parts by weight of a copolymerizable vinyl monomer or monomers and contains 30 parts by weight or more of a component having an α-methylstyrene content of 82% by weight or higher, more preferably 10 parts by weight or more of a component having its content of 86% by weight or higher. This copolymer has remarkably higher heat resistance as compared with those of the conventional copolymers. By the conventional emulsion polymerization technique, it is difficult to incorporate 30 parts by weight or more of a component containing 82% by weight or more of α-methylstyrene, and thus the resulting heat distortion temperature is 115°–117° C. at best. The copolymer according to this invention can easily have a heat distortion temperature of higher than 117° C. Further, by mixing a graft copolymer (B) with this copolymer (A), there can be obtained a resin composition having high heat resistance and excellent impact resistance. Such a resin composition may be obtained as follows:

The copolymer (A) is mixed with a graft copolymer (B) which is obtained by reacting 35–85% by weight of a diene rubber and 65–15% by weight of a monomer mixture comprising a monovinyl aromatic compound and an unsaturated nitrile compound having a proportion of the monovinyl aromatic compound to a unsaturated nitrile compound of 85–60: 15–40 so as to give a diene rubber content of 5–30% by weight, thereby a thermoplastic resin composition excellent in both heat resistance and impact resistance is obtained.

The copolymer according to the first invention is an α-methylstyrene high-content copolymer (A). Said copolymer is used to impart heat resistance to a thermoplastic resin composition according to the third invention.

The process for producing said copolymer is now described. α-Methylstyrene monomer is charged first into a reaction system for emulsion polymerization and, after making the system fully emulsified, acrylonitrile is continuously added dropwise with a very small amount each time, while in the polymerization system the proportion of the α-methylstyrene monomer and the acrylonitrile monomer is always maintained at such great excess of α-methylstyrene as a weight ratio of 90/10 or higher, more preferably 95/5 or higher, thereby the desired copolymer is obtained. In this case, the amount of the α-methylstyrene to be charged first is at least 65 parts by weight and up to 90 parts by weight. With an amount of less than 65 parts by weight, the heat resistances of the resulting copolymer and resin composition are reduced, while with an amount of more than 90 parts by weight, their mechanical properties are lowered. The amount of the acrylonitrile monomer to be continuously added dropwise is at least 10 parts by weight and up to 35 parts by weight. With an amount of less than 10 parts by weight, the percent conversion by polymerization is reduced, while with an amount of more than 35 parts by weight, the resulting copolymer tends to be colored on heating and also easily brings about deterioration in physical properties. The α-methylstyrene monomer to be charged first may contain up to 10% by weight based on the α-methystyrene monomer of a unsaturated nitrile compound, lower alkyl esters of methacrylic acid and acrylic acid and the like. The acrylonitrile monomer to be continuously added dropwise may contain up to 15% by weight based on the acrylonitrile monomer of a monovinyl aromatic an α-substituted type monovinyl aromatic compound, compound,/lower alkyl esters of methacylic acid and acrylic acid and the like. As a third component other than α-methylstyrene and acrylonitirle, it is possible to employ up to 5 parts by weight of the above-mentioned vinyl monomer or monomers substantially without adversely affecting heat resistance or impact resistance but when it is incorporated in an amount beyond the above range, both physical properties are lowered and thus not desirable.

The graft copolymer (B) to be used in thermoplastic resin composition according to the third invention may be obtained by reacting a diene rubber with a unsaturated nitrile compound and a monovinyl aromatic compound represented by acrylonitrile and styrene, respectively. The composition of said graft copolymer is such that the diene rubber comprises 35–80% by weight and the total of a unsaturated nitrile compound plus the monovinyl aromatic compound comprises 65–15% by weight, and it is preferred that the proportion of the monovinyl aromatic compound to a unsaturated nitrile compound is 85–60:15-40 on the weight basis. In the above-mentioned graft copolymer (B), examples of the diene rubber to be used are polybutadiene, polyisoprene, butadiene - styrene copolymers etc., but not restricted thereto. Also, examples of the monovinyl aromatic compound to be employed include, in addition to styrene, α-methylstyrene, chlorostyrene, tertiary-butyl-styrene etc. Examples of the above-mentioned unsaturated nitrile compound are acrylonitrile as well as methacrylonitrile etc. Further, a part of the above-mentioned monovinyl aromatic compound and unsaturated nitrile compound may be replaced by a lower alkyl ester of methacrylic acid or acrylic acid or the like.

The above-mentioned copolymer (A) and graft copolymer (B) may be preferably obtained by emulsion polymerization, but the type of polymerization is not limited to emulsion polymerization. Emulsion polymerization may be carried out in a conventional manner. For example, the above-mentioned monomer mixture may be reacted in the presence of a free-radical initiator in an aqueous dispersion. As the free-radical initiator, there may be mentioned peroxides such as potassium persulfate, ammonium persulfate, cumene hydroperoxide etc. In addition, other additives, e.g. a polymerization co-catalyst, a chain transfer agent, an emulsifier etc., which have heretofore been conventionally employed in emulsion polymerization may be appropriately chosen and used.

The heat resistance and impact resistance of the thermoplastic resin composition according to this invention can vary depending not only on the compositions of the copolymer (A) and the graft copolymer (B) respectively but also on the mixing ratio thereof. Therefore, the mixing ratio may be selected according to the desired heat resistance and impact resistance, and for the purpose of successfully achieving this invention, it is preferred to mix so that the diene rubber content of the composition after mixing is 5–30% by weight. Mixing itself may be effected in a known manner. For example, it is possible to mix respective latexes of the copolymer (A) and the graft copolymer (B) together, saltify the mixture to obtain a coagulated product and, after drying, use it. Alternatively, respective powders or pellets of the copolymer (A) and the graft copolymer (B) are kneaded in a roll mill, an extruder, a Banbury mixer, a kneader etc. and thereafter provided for use. In addition, if necessary, conventional stabilizer, pigments, lubricant, fillers etc. may be added on mixing.

This invention is more particularly described by the following examples, in which all the "parts" mean "parts by weight".

EXAMPLES AND COMPARATIVE EXAMPLES

1) Production of Copolymers (A)

The following materials were charged into a reactor equipped with a stirrer.

| Water | 250 parts |
|---|---|
| Sodium laurate | 3 parts |
| Sodium formaldehyde sulfoxylate | 0.4 part |
| Ferrous sulfate | 0.0025 part |
| Disodium ethylenediaminetetraacetate | 0.01 part |

After flushing with purified nitrogen and subsequent heating with stirring at 60° C. in a nitrogen stream, the monomer mixture (I) indicated in Table 1 was charged. After fully emulsifying and mixing the system, the monomer mixture (II) indicated in Table 1 was continuously added dropwise.

On completion of this addition, stirring was further continued at 60° C. and then the polymerization was terminated. The formed copolymer latex was coagulated with calcium chloride, then washed with water, filtered out and dried to obtain a powder polymer, which was then pelletized and measured for the heat resistance. In addition, the latex in the course of the reaction was taken as samples, and the composition was analyzed and the conversion to polymer was measured. The conversion, composition and heat resistance of the thus obtained copolymer are given in Table 1.

Further, using the same monomers as those for A-10 in Table 1 [the monomer mixtures (I) and (II)], the monomer mixture (I) was continuously added dropwise together with 0.5 part of cumene hydroperoxide and subsequently the monomer mixture (II) was continuously added dropwise together with 0.1 part of cumene hydroperoxide, after which stirring was continued at 60° C. The heat distortion temperature of the obtained copolymer was 113° C.

From the results shown in Table 1 and those described above, it is evident that the heat resistances of the copolymers of this invention are superior to those of the copolymers obtained in the prior art. That is, the α-methylstyrene - acrylonitrile copolymers obtained in the prior art had limited heat resistances because most of each such copolymer was composed of an alternating copolymer of α-methylstyrene and acrylonitrile. On the contrary, as shown as A-1 to 6 in Table 1, the copolymers of this invention contain components containing 82% by weight or more of α-methylstyrene and thus exhibit excellent heat resistances which have not heretofore been achieved.

2) Production of Graft Copolymers (B)

The following materials were charged into a reactor equipped with a stirrer.

| Water | 250 parts |
|---|---|
| Sodium formaldehyde sulfoxylate | 0.2 part |
| Ferrous sulfate | 0.0025 part |
| Disodium ethylenediaminetetraacetate | 0.01 part |
| Polybutadiene | 60 parts |

After flushing with purified nitrogen and subsequent heating with stirring at 60° C. in a nitrogen stream, 12 parts of acrylonitrile and 28 parts of styrene were continuously added dropwise together with 0.3 part of cumene hydroperoxide. On completion of this addition, stirring was continued at 60° C. and then the polymerization was terminated.

3) Production of Thermoplastic Resin Compositions

The copolymer (A) and graft copolymer (B) produced as described above were mixed together in the latex form at a proportion of 75:25, and this mixed latex was, after adding an antioxidant, coagulated with calcium chloride, washed with water, filtered out and dried to obtain a powder copolymer mixture, which was then pelletized and provided for measurement of physical properties. The results are shown in Table 2.

As evident from the results of Table 2, the compositions C-1 to 6 according to this invention exhibit remarkably superior heat resistance as compared with the prior art compositions and afford thermoplastic resins having a combination of the desired excellent heat and impact resistances.

TABLE 1

| No. | Example | | | | | | Comparative Example | | | |
|---|---|---|---|---|---|---|---|---|---|---|
| | A-1 | A-2 | A-3 | A-4 | A-5 | A-6 | A-7 | A-8 | A-9 | A-10 |
| Monomer Mixture (I) | | | | | | | | | | |
| α-Methylstyrene (pts) | 80 | 75 | 70 | 75 | 70 | 75 | — | — | — | 70 |
| Acrylonitrile (pts) | — | — | — | — | 5 | — | — | — | — | 20 |
| t-Dodecylmercaptan (pts) | 0.2 | 0.2 | 0.2 | 0.2 | 0.2 | 0.2 | — | — | — | 0.2 |
| Monomer Mixture (II) | | | | | | | | | | |
| Acrylonitrile (pts) | 20 | 25 | 30 | 22 | 22 | 22 | 20 | 25 | 30 | 8.5 |
| α-Methylstyrene (pts) | — | — | — | 3 | 3 | — | 80 | 75 | 70 | 1.5 |
| Methyl methacrylate (pts) | — | — | — | — | — | 3 | — | — | — | — |
| Cumeme hydroperoxide (pts) | 0.5 | 0.5 | 0.5 | 0.5 | 0.5 | 0.5 | 0.5 | 0.5 | 0.5 | 0.5 |
| t-Dodecylmercaptan (pts) | 0.2 | 0.2 | 0.2 | 0.2 | 0.2 | 0.2 | 0.4 | 0.4 | 0.4 | 0.2 |
| α-Methylstyrene Content at a Polymer Yield of 40–50 pts. (%)* | 83 | 82 | 82 | 83 | 82 | 82 | 70 | 69 | 68 | 69 |
| Final Conversion to Polymer (%) | 96 | 97 | 96 | 97 | 97 | 97 | 88 | 93 | 96 | 96 |
| Heat Distortion Temperature ASTM D-648 (load 18.6 kg/cm$^2$) | 121 | 121 | 119 | 121 | 120 | 111 | 111 | 111 | 110 | 111 |

*Calculated from the elemental analysis of the polymer.

TABLE 2

| No. | Example | | | | | | Comparative Example | | | |
|---|---|---|---|---|---|---|---|---|---|---|
| | C-1 | C-2 | C-3 | C-4 | C-5 | C-6 | C-7 | C-8 | C-9 | C-10 |
| Copolymer (A) | A-1 | A-2 | A-3 | A-4 | A-5 | A-6 | A-7 | A-8 | A-9 | A-10 |
| Tensile Strength (kg/cm$^2$) | 510 | 521 | 530 | 525 | 529 | 518 | 501 | 510 | 539 | 524 |

TABLE 2-continued

| No. | Example | | | | | | Comparative Example | | | |
|---|---|---|---|---|---|---|---|---|---|---|
| | C-1 | C-2 | C-3 | C-4 | C-5 | C-6 | C-7 | C-8 | C-9 | C-10 |
| ASTM D-636 Izot Impact Strength (kg.cm/cm) Notched ASTM D-256 | 13.5 | 14.1 | 15.1 | 14.5 | 14.7 | 14.3 | 13.6 | 14.8 | 15.3 | 14.4 |
| Heat Distortion Temp. 18.6 kg/cm$^2$ ASTM D-648 | 115 | 114 | 112 | 114 | 113 | 113 | 103 | 104 | 103 | 106 |

What is claimed is:

1. A process for producing a copolymer of α-methylstyrene and acrylonitrile having a high heat distortion temperature comprising:
   (a) charging 65 to 90 parts by weight of α-methylstyrene and up to 10% by weight based on the α-methylstyrene of a monomer selected from the group consisting of acrylonitrile, a lower alkyl ester of methacrylic acid and a lower alkyl ester of acrylic acid into a polymerization system in one portion;
   (b) emulsifying the monomer or monomers in the polymerization system in (a) to form an emulsion polymerization system;
   (c) continuously and gradually adding 10 to 35 parts by weight of acrylonitrile and up to 15% by weight based on the acrylonitrile of a monomer selected from the group consisting of α-methylstyrene, a lower alkyl ester of methacrylic acid and a lower alkyl ester of acrylic acid to the emulsion polymerization system and simultaneously polymerizing the monomers until the amount of copolymer produced is at least 50 parts by weight or more while maintaining the weight ratio of α-methylstyrene to the other monomers in the emulsion polymerization system at 90:10 or higher.

2. A copolymer having a high content of α-methylstyrene produced by the process comprising:
   (a) charging 65 to 90 parts by weight of α-methylstyrene and up to 10% by weight based on the α-methylstyrene of a monomer selected from the group consisting of acrylonitrile, a lower alkyl ester of methacrylic acid and a lower alkyl ester of acrylic acid into a polymerization system in one portion;
   (b) emulsifying the monomer or monomers in the polymerization system in (a) to form an emulsion polymerization system;
   (c) continuously and gradually adding 10 to 35 parts by weight of acrylonitrile and up to 15% by weight based on the acrylonitrile of a monomer selected from the group consisting of α-methylstyrene, a lower alkyl ester of methacrylic acid and a lower alkyl ester of acrylic acid to the emulsion polymerization system and simultaneously polymerizing the monomers until the amount of copolymer produced is at least 50 parts by weight of more while maintaining the weight ratio of α-methylstyrene to the other monomer in the emulsion polymerization system at 90:10 or higher;
   said copolymer consisting essentially of 65 to 90 parts by weight of α-methylstyrene, 35 to 10 parts by weight of acrylonitrile and 0 to 5 parts by weight of a lower alkyl ester of methacrylic acid and/or a lower alkyl ester of acrylic acid and having a heat distortion temperature of greater than 117° C.;
   30 parts by weight or more of the copolymer having an α-methylstyrene content of 82% by weight of more.

3. A process according to claim 1, further comprising the step of recovering the copolymer after completion of step (c).

* * * * *

UNITED STATES PATENT AND TRADEMARK OFFICE
CERTIFICATE OF CORRECTION

PATENT NO. : 5,171,814

DATED : December 15, 1992

INVENTOR(S) : Sigemi MATSUMOTO, Fumiya NAGOSHI

It is certified that error appears in the above-identified patent and that said Letters Patent is hereby corrected as shown below:

On the cover page, Item [75], the inventor's name "Shigemi Mathumoto" should read --Sigemi Matsumoto--.

Column 5, Table 1, Sample A-6, under heading Heat Distortion Temperature, "111" should read --120--.

Signed and Sealed this

First Day of February, 1994

*Attest:*

BRUCE LEHMAN

*Attesting Officer*     *Commissioner of Patents and Trademarks*